United States Patent
Le et al.

(10) Patent No.: US 10,726,007 B2
(45) Date of Patent: Jul. 28, 2020

(54) BUILDING HEAVY HITTER SUMMARY FOR QUERY OPTIMIZATION

(71) Applicant: Microsoft Technology Licensing, LLC, Redmond, WA (US)

(72) Inventors: Wangchao Le, Redmond, WA (US); Yongchul Kwon, Kirkland, WA (US); Marc Todd Friedman, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 470 days.

(21) Appl. No.: 15/716,202

(22) Filed: Sep. 26, 2017

(65) Prior Publication Data
US 2019/0095487 A1 Mar. 28, 2019

(51) Int. Cl.
*G06F 16/00* (2019.01)
*G06F 16/2453* (2019.01)

(52) U.S. Cl.
CPC .. *G06F 16/24539* (2019.01); *G06F 16/24534* (2019.01)

(58) Field of Classification Search
CPC ............ G06F 11/3447; G06F 11/3452; G06F 16/2425; G06F 17/18; G06F 9/542; G06F 11/00; G06F 11/3442; G06F 11/3457; G06F 12/0802; G06F 16/24534; G06F 16/24539; G06F 21/56; G06F 21/566; G06F 3/013; G06F 3/03543; G06F 9/3001; G06F 9/30036
See application file for complete search history.

(56) References Cited

U.S. PATENT DOCUMENTS

| | | |
|---|---|---|
| 9,183,254 B1 | 11/2015 | Cole et al. |
| 2008/0033277 A1 | 2/2008 | Yang et al. |
| 2011/0029571 A1 | 2/2011 | Aggarwal et al. |
| 2015/0142773 A1 | 5/2015 | Mindnich et al. |
| 2016/0098662 A1 | 4/2016 | Voss et al. |
| 2016/0154805 A1 | 6/2016 | Finnerty et al. |

(Continued)

FOREIGN PATENT DOCUMENTS

WO 2016168211 A1 10/2016

OTHER PUBLICATIONS

Cormode, Graham, "Sketch Techniques for Approximate Query Processing", In Proceedings of Foundations and Trends in Databases, 2011, 67 pages.

(Continued)

*Primary Examiner* — Yicun Wu
(74) *Attorney, Agent, or Firm* — Workman Nydegger

(57) ABSTRACT

Constructing a heavy hitter summary for query optimization. The heavy hitter summary is constructed by sampling each of multiple partitions of a dataset using a uniformed sampling rate. For each partition, performing a two-stage heavy hitter estimation process to determine whether an estimated frequency of a key of the sampled data units may be included in a partition-level heavy hitter summary. Constructing a partition-level heavy hitter summary for each partition of the dataset based on the keys determined via the two-stage process, and constructing a dataset-level heavy hitter summary based on the partition-level heavy hitter summary. The dataset-level heavy hitter summary may be used to optimize query trees.

20 Claims, 9 Drawing Sheets

(56) References Cited

U.S. PATENT DOCUMENTS

2016/0179852 A1  6/2016  Naibo et al.

OTHER PUBLICATIONS

Cohen, et al., "MAD Skills: New Analysis Practices for Big Data", In Proceedings of the VLDB Endowment, vol. 2, Issue 2, Aug. 24, 2009, 12 pages.

Cormode, et al., "Sampling for Big Data", https://www.google.co.in/url?sa=t&rct=j&q=&esrc=s&source=web&cd=1&ved=0ahUKEwie9sG3547SAhWHKo8KHYtuAXwQFggZMAA&url=http%3A%2F%2Fwww.kdd.org%2Fkdd2014%2Ftutorials%2Ft10_part1.pptx&usg=AFQjCNHhs1ISICWp0Oy8QWC-QWJhAwJ1-g&sig2=n7Eugb2paaGf8M9qTCac3w&bvm=bv.146786187,d.c2l, Retrieved on: Feb. 10, 2017, 50 pages.

Bar-Sinai, et al., "Big Data Technology Literature Review", In Proceedings of Computing Research Repository, Jun. 2015, pp. 1-10.

BUILDING HEAVY HITTER SUMMARY FOR QUERY OPTIMIZATION

BACKGROUND

Computing systems and associated networks have greatly revolutionized our world. The interconnection of such computing systems into networks has resulted in explosive growth in the ability to communicate data ushering in what is now called the "information age". Information is often stored, managed and analyzed in datasets. In recent years the volume of data stored in datasets has grown rapidly, ushering in technology often referred to as "big data". Such data growth is multi-dimensional, including increasing volume (amount of data), velocity (speed of data in and out), and variety (range of data types and sources).

Datasets may exist in many forms. Commercial datasets often use parallel database management systems for large quantities of data, such that the data may be stored and distributed across multiple servers, multiple storage devices, and/or multiple partitions of a storage device. To reveal meaningful information from such a large quantity of data, data management systems often provide query interfaces that can receive and interpret queries issued by users against the system's data. Query results are generated by accessing a relevant dataset and manipulating it in a way that yields the requested data.

Since dataset structures are complex, the response data for any given query can often be collected from a dataset using any of a variety of different ways of executing the query. Each possible query execution typically requires different computing resources, such as processing time, memory, network bandwidth, storage channel bandwidth, and so forth. For instance, processing times of the same query may have a large variance, from a fraction of a second to hours, depending on the selected execution of that query. This is especially true as datasets grows larger.

Thus, query optimization is used to find a way to process a given query in less time. For instance, a query is typically compiled into a query tree of operators. The query tree is then improved via a query optimizer. The optimized query tree is then executed to yield the requested data. By optimizing the query tree, query performance can be improved.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to building a heavy hitter summary for query optimizations. Heavy hitters are the most frequent items queried upon in a data distribution. For instance, a query optimization may take into consideration heavy hitters that occur at one or more levels of a candidate query tree. The candidate query tree is evaluated in view of the heavy hitters to determine whether the candidate query tree would improve performance. That may be repeated for multiple candidate query trees until a suitable optimized query tree is found. The use of heavy hitter data at various nodes of the candidate tree improves accuracy in identifying those query trees that would improve performance, and thus is helpful in query optimization.

In a distributed data management system, a dataset may be stored in multiple partitions; and multiple data units (each represented by a key) may be stored in each of the multiple partitions. In accordance with the principles described herein, for each of the partitions of the dataset, the system undergoes a two-stage heavy hitter estimation process.

In the first stage, for each of the sampled data units, the system determines whether or not an estimated frequency of a key of the sampled data units meets a first stage frequency threshold. In the second stage, for each of the sampled data units that has not been determined to satisfy the first stage frequency threshold, the system determines whether or not an estimated frequency of a key of the sampled data units meets a second stage frequency threshold.

Then, the system constructs a partition-level heavy hitter summary for the corresponding partition of the data. The partition-level heavy hitter summary includes all the keys for the data units in the corresponding partition that satisfy the first stage frequency threshold in the first stage, and all the keys for the data units in the corresponding partition that satisfy the second stage frequency threshold in the second stage.

Though not required, the partition-level heavy hitter summary may contain (1) each of at least some of the keys included within the partition-level heavy hitter summary, and (2) the corresponding estimated frequency of the key. For each of at least some keys included within one or more of the partition-level heavy hitter summaries, a dataset-level frequency of the key is estimated. The dataset-level frequency of the key may include (1) each of at least some of the keys for which a partition-level frequency has been estimated; and (2) the corresponding estimated dataset-level frequency of the corresponding key.

In some embodiments, in response to accessing a compiled query tree, a candidate query tree corresponding to the compiled query tree may be generated. At least some of the keys included in the dataset-level heavy hitter frequency structure are associated with at least some of the nodes of the candidate query tree. The frequencies of each of at least some of the keys associated with the at least some of the nodes of the candidate query tree are estimated based on the dataset-level heavy hitter frequency structure. Then, a determination of whether the candidate query tree is an optimized form of the compiled query tree is made based at least in part on the dataset-level frequencies of each of the at least some of the keys associated with the at least some of the nodes of the candidate query tree.

The principles described herein may be effectively performed on massively distributed data to generate a dataset-level heavy hitter summary using unbiased samples across multiple partitions of a dataset within a bounded error rate. Furthermore, the principles described herein may also be effectively performed on unknown-sized or changing-sized datasets (e.g., streaming dataset) by adjusting the uniformed sampling rate of each partition of the dataset under a progressive sampling scheme.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
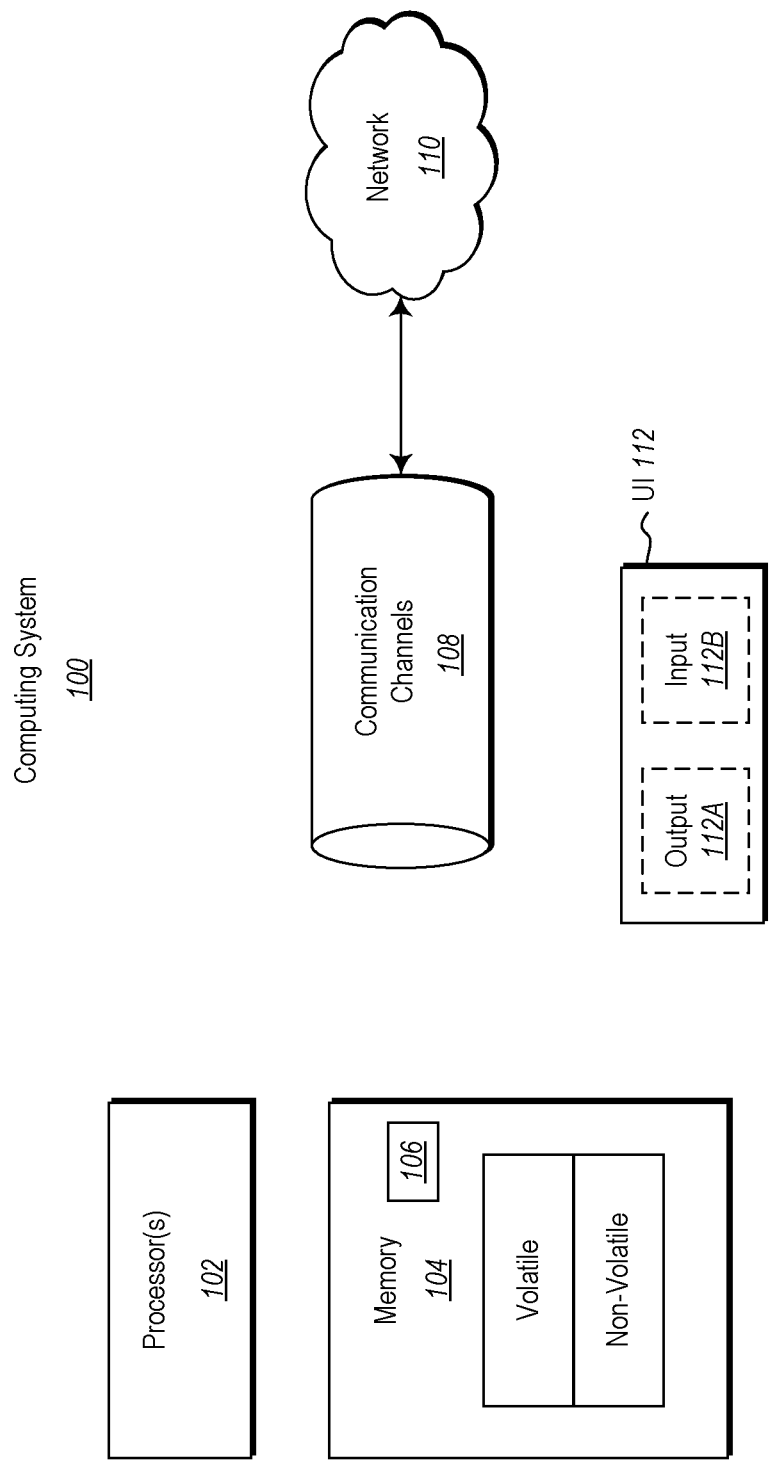
FIG. 1 illustrates an example computer system in which the principles described herein may be employed.

At least some embodiments described herein relate to building a heavy hitter summary for query optimizations. Heavy hitters are the most frequent items queried upon in a data distribution. For instance, a query optimization may take into consideration heavy hitters that occur at one or more levels of a candidate query tree. The candidate query tree is evaluated in view of the heavy hitters to determine whether the candidate query tree would improve performance. That may be repeated for multiple candidate query trees until a suitable optimized query tree is found. The use of heavy hitter data at various nodes of the candidate tree improves accuracy in identifying those query trees that would improve performance, and thus is helpful in query optimization.

In a distributed data management system, a dataset may be stored in multiple partitions; and multiple data units (each represented by a key) may be stored in each of the multiple partitions. In accordance with the principles described herein, for each of the partitions of the dataset, the system undergoes a two-stage heavy hitter estimation process.

In the first stage, for each of the sampled data units, the system determines whether or not an estimated frequency of a key of the sampled data units meets a first stage frequency threshold. In the second stage, for each of the sampled data units that has not been determined to satisfy the first stage frequency threshold, the system determines whether or not an estimated frequency of a key of the sampled data units meets a second stage frequency threshold.

Then, the system constructs a partition-level heavy hitter summary for the corresponding partition of the data. The partition-level heavy hitter summary includes all the keys for the data units in the corresponding partition that satisfy the first stage frequency threshold in the first stage, and all the keys for the data units in the corresponding partition that satisfy the second stage frequency threshold in the second stage.

Though not required, the partition-level heavy hitter summary may contain (1) each of at least some of the keys included within the partition-level heavy hitter summary, and (2) the corresponding estimated frequency of the key. For each of at least some keys included within one or more of the partition-level heavy hitter summaries, a dataset-level frequency of the key is estimated. The dataset-level frequency of the key may include (1) each of at least some of the keys for which a partition-level frequency has been estimated; and (2) the corresponding estimated dataset-level frequency of the corresponding key.

In some embodiments, in response to accessing a compiled query tree, a candidate query tree corresponding to the compiled query tree may be generated. At least some of the keys included in the dataset-level heavy hitter frequency structure are associated with at least some of the nodes of the candidate query tree. The frequencies of each of at least some of the keys associated with the at least some of the nodes of the candidate query tree are estimated based on the dataset-level heavy hitter frequency structure. Then, a determination of whether the candidate query tree is an optimized form of the compiled query tree is made based at least in part on the dataset-level frequencies of each of the at least some of the keys associated with the at least some of the nodes of the candidate query tree.

The principles described herein may be effectively performed on massively distributed data to generate a dataset-level heavy hitter summary using unbiased samples across multiple partitions of a dataset within a bounded error rate. Furthermore, the principles described herein may also be effectively performed on unknown-sized or changing-sized datasets (e.g., streaming dataset) by adjusting the uniformed sampling rate of each partition of the dataset under a progressive sampling scheme.

Because the principles described herein operate in the context of a computing system, a computing system will be described with respect to FIG. 1. Then, the principles of query optimization will be described with respect to FIGS. 2 through 13B.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structures may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms, virtual reality, and so forth. Examples of input mechanisms 112B might include, for instance, microphones, touchscreens, holograms, virtual reality, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

In a typical distributed network computing system, a processor may execute computer-executable instructions and read data from storage medium. Ranked by the efficiency of reading data, fetching data from local RAM is fastest, followed by local disk and then shipping data across network. Ranked by the scarcity and cost of storage medium, local RAM is limited, expensive and under high usage contention, local disk comes next, and remote storage is ample and hence ideal for a program to store data across network. Given the aforementioned Scarcity vs. Execution Burden Factor matrix, a more optimized program operated in the aforementioned network computing system should minimize the data movement across network when possible and if not, spill data to remote disks to leverage faster storage medium remotely.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Figure 2:
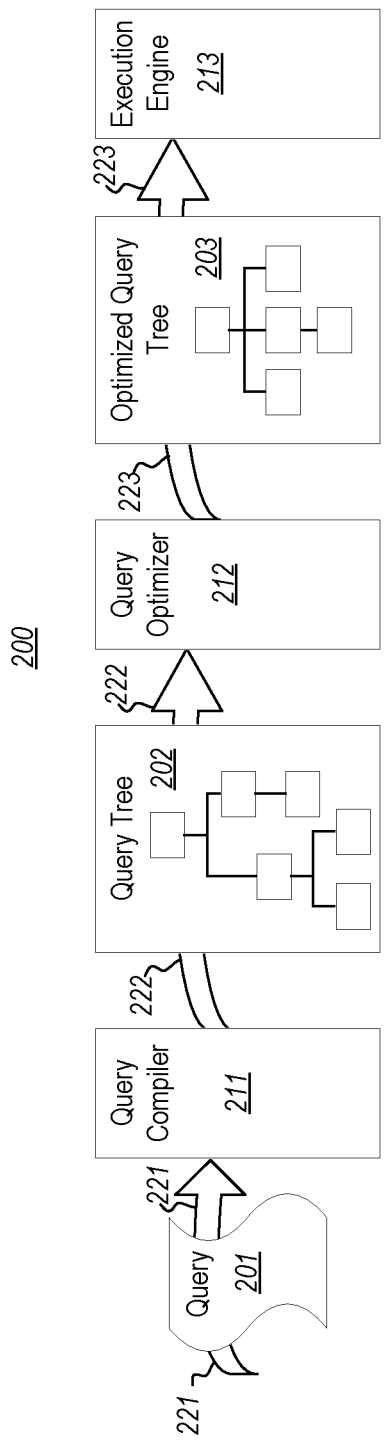
FIG. 2 illustrates a query processing environment in which a query is compiled into a query tree, the query tree is optimized, and the optimized query tree is provided to an execution engine.

FIG. 2 illustrates a query environment 200 in which query optimization is performed. The query environment 200 may be executed on, for instance, the computing system 100 of FIG. 1, or multiple of such computing systems. In one embodiment, the query environment 200 exists in a cloud computing environment.

First, a query is received (as represented by the query 201 and the arrow 221) by a query compiler 211. The query compiler 211 generates a compiled query tree 202 that represents the parsed operations represented in the query 201. The compiled query tree 202 is a query tree of operators representing parallel query operations. The compiled query tree 202 is then provided (as represented by arrow 222) to a query optimizer 212. The query optimizer 212 optimizes the received query tree 202 to generate an optimized query tree 203 that is anticipated to be faster at executing than the original received query tree 202.

The optimized query tree 203 may perform the same (or substantially the same) functions as would the original compiled query tree 202, except with better performance. For instance, the optimized query tree 203 may perform faster, use fewer resources, and/or provide any other benefit during execution. The optimized query tree 203 is then provided (as represented by arrow 223) to an execution engine 213 for execution of the optimized query tree. For instance, the execution engine 213 may select and/or generate an execution plan that is used to execute the optimized query tree and generate query results.

A query tree (such as the query tree 202) is composed of relational operators. A relational operator defines a relation from one or more of its inputs. For instance, a relation may be defined by a table with a schema. A table may contain one or many rows, or perhaps no row at all. If rows are present, each row in the table conforms to the same predefined schema from the operator. A relational operator may be an input to its parent relational operator, which recursively defines an operator tree. A set of commonly used relational operators includes, but is not limited to, the following: 1)

finding the common intersections for two or more input relations (e.g., Join); 2) merging all input relations into one relation, (e.g., Union); 3) filtering an input relation with a predicate (e.g., Select); 4) grouping an input relation by value (e.g., GroupBy); 5) adding a new column to each input row of the relation (e.g., Project); and 6) reading an input from a storage medium (e.g., Scan).

When evaluating a query, different query trees might be able to achieve the same results. For instance, the Union of two relations followed by a Select of a part of the result by a predicate may instead be performed by applying the predicate (Select) first on each of the two input relations and only thereafter performing the Union of the filtered results. In this example, while the results of the two query trees are the same, the two alternative execution orders might have disparate performance during evaluation.

By default, an operator might operate in a serial mode. For instance, the whole of the input data may be consumed by one operator to thereby produce output. Often times, this is not possible nor efficient due to the sheer amount of data typically operated upon in the cloud computing system. Alternatively, an operator may operate in a parallel mode, which is often termed "parallel execution". In that case, the computing system could instantiate multiple copies of the same operator, each operator instance processing a subportion of the input relation. During the optimization, the optimizer decides whether to schedule a parallel execution for an operator and if so, how many instances should be created.

A parallel execution does not necessarily yield a better performance and is not necessarily less of an execution burden compared to its serial counterpart. For instance, there is a tradeoff between whether the system should take advantage of fast but scarce local storage or should rather dispatch more data to slow but ample remote storage. Such a tradeoff might exist in a typical configuration of a cloud computing environment.

Considering this, the "execution burden factor" of a query tree is now defined. An execution burden factor represents the work needed to be done in order to produce the final output. An execution burden factor for a query tree consists of 1) the aggregated execution burden factor of all operators in the query tree; and 2) the aggregated execution burden factor of movement of data from and into remote storages. Meanwhile, the execution burden factor of an operator is defined by the estimated time to execute the operator specifically executable against a unit of data, multiplied by the input data volume of that unit of data. The execution burden factor of data movement is defined by the amortized time to move a unit of data across a network, multiplied by the data volume.

For each operator, the execution burden factor of processing a unit of data is known a priori as this is defined by the executable instructions. The execution burden factor of an operator is then dominated by the volume of data the operator needs to process as well as the locality of the data. In a cloud computing system, the bandwidth for interlinked computers is usually a reliable constant since the speed for moving a unit of data across a network is predictable. Therefore, the execution burden factor of data movement is proportional to the data size being moved. Finally, in order for the optimizer to rank all query tree candidates by their execution burden factors, the optimizer must have confident estimations on the volume of data input to and output from any operator.

The principles described herein improve the performance and accuracy of the query optimizer by having the query optimizer perform query optimization based on the actual data that the query is operating upon. That is, query optimization is performed not just as the data is input to the query, but based on data that results from one or more operations of the query itself. In particular, the query optimization is based on the estimated key frequency contained in the heavy hitter summary.

Figure 3:
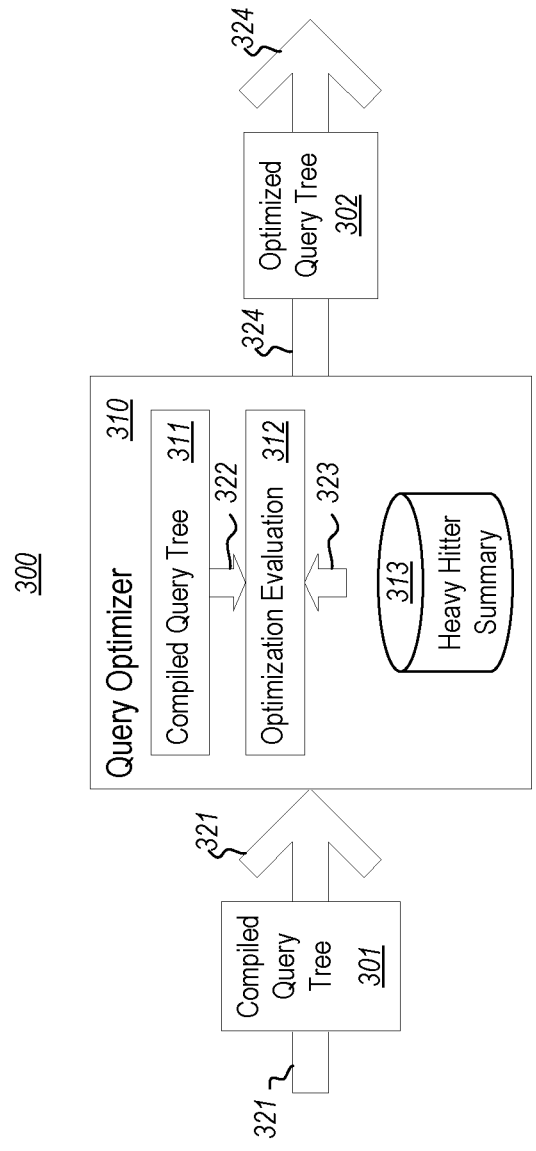
FIG. 3 illustrates a query optimization environment in more detail, and focuses on the query optimization.
Figure 4:
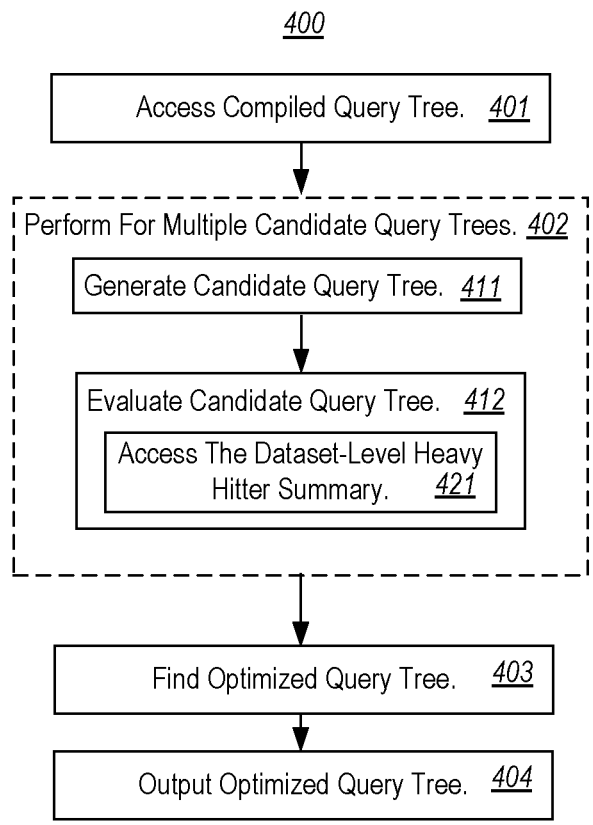
FIG. 4 illustrates a flowchart of a method for performing query optimization in accordance with the principle described herein.

FIG. 3 illustrates a query optimization environment 300 in more detail, and focuses on the query optimization operation. The query optimization environment 300 includes a query optimizer 310. The query optimizer 310 represents one example of the query optimizer 212 of FIG. 2. FIG. 4 illustrates a flowchart of a method 400 for performing query optimization in accordance with the principles described herein. The method 400 may be performed by the query optimizer 310 of FIG. 3. Accordingly, the method 400 will now be described with frequent reference to the query optimizer 310 of FIG. 3. The method 400 may be performed for each query received by the query environment 200.

A query tree is first accessed from a query compiler (act 401). For instance, in FIG. 3, a query optimizer 310 receives the compiled query tree 301 (as represented by the arrow 321). The compiled query tree 301 is an example of the compiled query tree 202 of FIG. 2. Each of the candidate query trees has multiple leaf nodes, where each leaf node represents data input into the query, and each parent node represents operations to be performed on data flows received from the child nodes. Alternatively, a query tree may be represented in which the nodes represent the data flows, and the connections between nodes represent operations. These two alternatives are the same as the computing system views them in the same way in terms of the output by the top operator.

As illustrated in FIGS. 3 and 4, during optimization, an optimization evaluation component 312 of the optimizer 310 may access (as represented by arrow 323 and act 421) a heavy hitter summary 313 and the compiled query tree (as represented by arrow 322) to estimate the key frequency of at least some of the nodes of the query tree. The optimizer 310 may also generate (act 411) a candidate query tree 302 that corresponds to the compiled query tree 311 based on the estimated key frequency of the nodes of the query tree. The query tree node that has a lower key frequency value generally should be propagated to a higher level. As represented by the box 402, for each candidate query tree generated (or for at least some of those candidate query trees), the candidate query tree is evaluated based on the key frequency value contained in dataset-level heavy hitter summary (act 412). After an optimized query tree is found (act 403) (e.g., by recognizing a candidate query tree as suitably optimized), the optimizer 310 outputs the optimized query tree (act 404). For instance, in FIG. 3, the optimized query tree 302 is output by the query optimizer 310 as represented by the arrow 324.

Figure 12A:
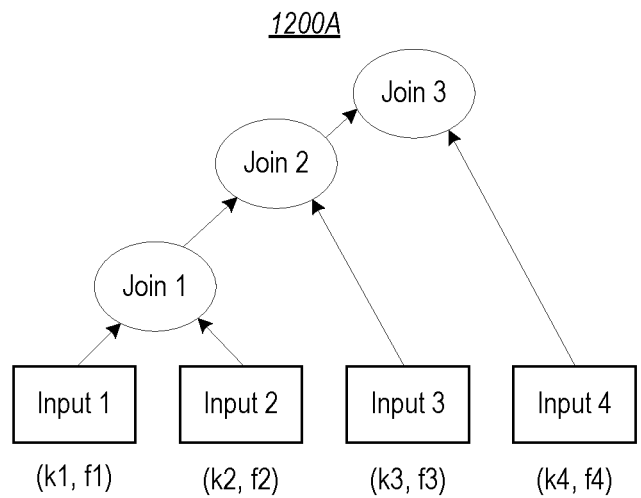
FIGS. 12A and 12B illustrate different example candidate query trees in which the keys and frequencies are obtained from heavy hitter summaries.
Figure 12B:
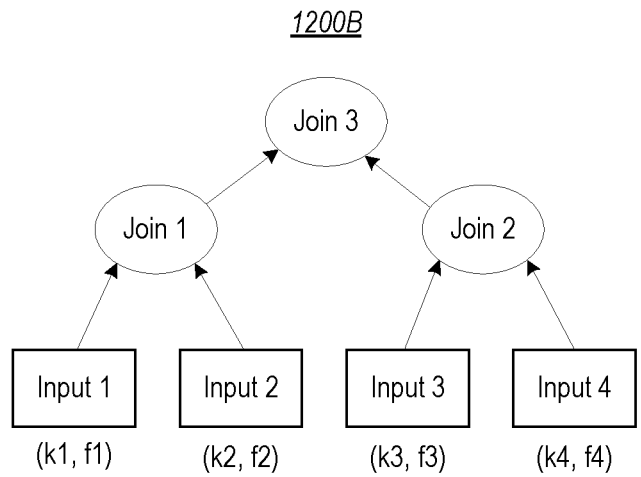

One example to showcase the effect of propagating the heavy hitter information up to the query tree node is illustrated in the candidate query trees of FIGS. 12A and 12B. The two candidate query trees 1200A and 1200B compute the same output for three joins (i.e., intersections) using four inputs. Assuming all four inputs (Inputs 1 to 4) are heavy hitters, each input's key-frequency values are estimated in the heavy hitter summary. For instance, input 1 corresponds to key k1 with a key frequency f1; input 2 corresponds to key k2 with a key frequency f2; input 3 corresponds to key k3 with a key frequency f3; and input 4 corresponds to key k4 with a key frequency f4.

In this example, assume that there are a total of N data units in the dataset. Following the query tree 1200A, since the frequency of the key of input 1 is f1, and the frequency of the key of input 2 is f2, the number of samples of input 1 may be estimated as f1*N, and the number of samples of input 2 may be estimated as f2*N. The join of the two inputs (Join 1 (input 1, input2)) would thus be estimated as the join of the samples (Join 1 (f1*N, f2*N)). Accordingly, the total number of computations required by join 1 may be estimated as f1*f2*N*N, and then the total number of outputs of the join 1 may be estimated as f1*f2*N. An example of this will be discussed with respect to FIG. 13A.

Moving to Join 2 of FIG. 12A, the inputs to Join 2 are 1) the output of Join 1 and 2) the input 3. Since the frequency of the key of input 3 is f3, the number of inputs of input 3 may be estimated as f3*N. The join of its two inputs (i.e., Join 2 (Join 1, input 3)) may be estimated as the join of the constituent samples (Join 2 (f1*f2*N, f3*N)). Accordingly, the total number of computations required by Join 2 may be estimated as f1*f2*f3*N*N. The total outputs of the join 2 may be estimated as f1*f2*f3*N.

Moving to Join 3 in FIG. 12A, the inputs to Join 3 are 1) the output of Join 2 and 2) the input 4. Since the frequency of the key of input 4 is f4, the number of inputs of input 4 may be estimated as f4*N. The join of its two inputs (i.e., Join 3 (Join 2, input 4)) may be estimated as the join the constituent samples (Join 3 (f1*f2*f3*N, f4*N)). Accordingly, the total number of computations required by Join 3 may be estimated as f1*f2*f3*f4*N*N.

Summing up the total number of computations estimated for each of the three joins, the query optimizer may estimate the total number of computations required for the query tree 1200A as f1*f2*N*N+f1*f2*f3*N*N+f1*f2*f3*f4*N*N which equals (f1*f2+f1*f2*f3+f1*f2*f3*f4)*N*N. Thus, the number of computations required to perform the query in accordance with the candidate query tree 1300A may be estimated using the heavy hitter summaries.

As for the candidate query tree 1200B, the input 1 and input 2 are joined by Join 1; and input 3 and input 4 are joined by Join 2. Then, the output of Join 1 and Join 2 are joined by Join 3. Since input 1 has a key frequency f1, and input 2 has a key frequency f2, the join of the inputs to Join 1 (Join 1 (input 1, input 2)) may be estimated as the join of the samples of input 1 and input 2 (e.g., Join 1 (f1*N, f2*N)). In like manner, the total number of computations required by Join 1 may be estimated as f1*f2*N*N, and the number of outputs of the Join 1 may be estimated as f1*f2*N. Using principles of symmetry, the total number of computations required by Join 2 may be estimated as f3*f4*N*N, and the total number of outputs of Join 2 may be estimated as f3*f4*N.

The inputs of Join 3 of FIG. 12B are the outputs of Join 1 and Join 2. As explained above, the number of outputs of Join 1 is estimated as f1*f2*N, and the number of outputs of Join 2 is estimated as f3*f4*N. Accordingly, Join 3 (Join 1, Join 2) may be estimated as Join 3 (f1*f2*N, f3*f4*N). Therefore, the total number of computations required by Join 3 may be estimated as f1*f2*f3*f4*N*N.

Finally, summing up the total number of computations required by each of the three joins in FIG. 12B, we arrive at the estimated number of computations for the query tree 1200B, which is the following: f1*f2*N*N+f3*f4*N*N+f1*f2*f3*f4*N*N=(f1*f2+f3*f4+f1*f2*f3*f4)*N*N.

Since f1, f2, f3 and f4 are all the key frequencies contained in the heavy hitter summary, the query optimizer can compare the estimated number of computations for each of the candidate query trees and determine a sufficiently optimized candidate query tree.

For example, assuming f1=10%, f2=20%, f3=30% and f4=40%, the total number of computations required to complete the query tree 1200A would be: (10%*20%+10%*20%*30%+10%*20%*30%*40%)*N*N=2.84%*N*N and the total number of computations required to complete the query tree in FIG. 12B would be: (10%*20%+30%*40%+10%*20%*30%*40%)*N*N=14.24%*N*N.

From this example, we can see that even though the query tree 1200B computes join 1 and join 2 in parallel, the processing of candidate query tree 1200B requires more than five times the number of computations compared to the candidate query tree 1200A in order to respond to the same query. As mentioned previously, parallel execution requires more hardware resources, which is often hard to accommodate. In such cases, query tree 1200A clearly generates a better execution plan than query tree 1200B. Therefore, the query optimizer is likely to select query tree 1200A as the optimized candidate query tree between query trees 1200A and 1200B.

There may be situations in which some of the leaf nodes are not contained in the heavy hitter summary, such as if the frequency of the input of the leaf node has a low frequency value. The optimizer generally might propagate such a low frequency leaf node so that the lower frequency node will be computed first. Alternatively, the optimizer may first assume the low frequency leaf node's frequency is lower than the threshold frequency, and then estimate the total number of computations based on the assumed frequency of the non-heavy hitter leaf nodes and the estimated frequency of the heavy hitter leaf nodes.

Figure 5:
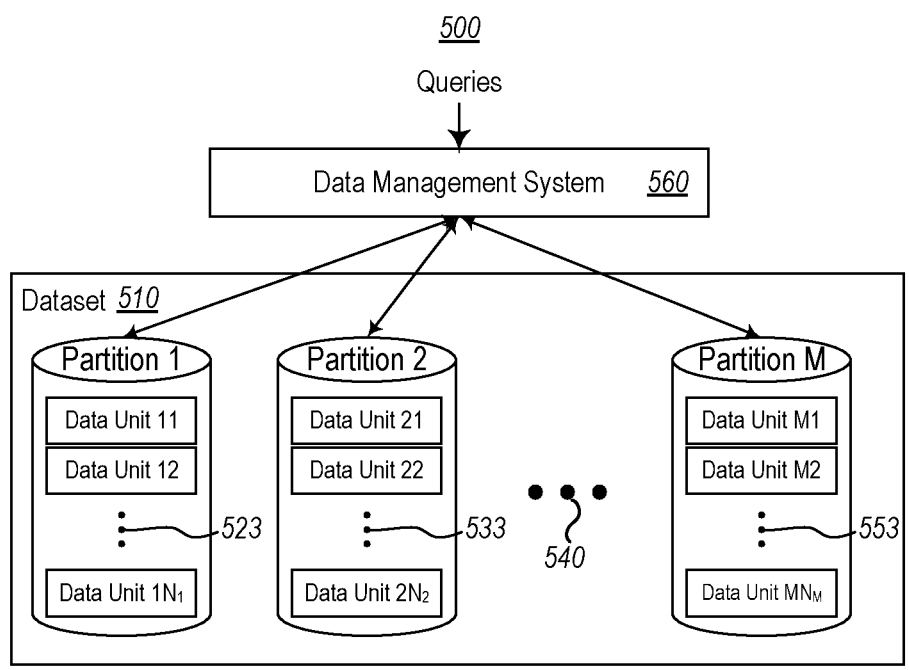
FIG. 5 illustrates a distributed database environment, in which a computing system manages a dataset, and the dataset contains multiple partitions.

FIG. 5 illustrates a distributed dataset environment 500, in which a data management system 560 manages a dataset 510. In a distributed data management system, a dataset 510 may be stored in multiple partitions (e.g., partition 1, partition 2, and partition M, where M is any positive integer). The ellipsis 540 represents that there may be any whole number (M) of partitions that are included in the dataset 510.

In each of the partitions, files are normally divided into chunks (hereinafter referred to as data units), which have a pre-determined size (e.g., typically 64 megabytes). For instance, partition 1 includes data unit 11, data unit 12, and data unit $1N_1$. The ellipsis 523 and symbol "$N_1$" represent that there may be any whole number ($N_1$) of data units in the partition 1. Similarly, partition 2 includes data unit 21, data unit 22, and data unit $1N_2$; and partition M includes data unit M1, data unit M2, and data unit $MN_M$. Also, similarly, the ellipsis 533 and symbol "$N_2$" represent that there may be any whole number ($N_2$) of data units in the partition 2; and the ellipsis 553 and symbol "$N_M$" represent that there may be any whole number ($N_M$) of data units in the partition M.

There are many reasons why distributed dataset environments have become increasingly popular. Such reasons include reliability, security, cost-effectiveness, locality of access, growth, speed, resource efficiency, responsibility, containment, and so forth. For instance, distributing the dataset into multiple partitions may reduce the chances of data loss. Specifically, if a failure occurs in one partition of the distribution, the entire dataset is not lost. Instead, if a failure occurs in the overall network, a user may still get access to his/her partition of the dataset. Furthermore, if a new location is added to a system, it is easier to create an additional partition with the dataset, which makes distribution highly scalable and extendable. Some queries with the dataset may be performed at a partition-level, so as to reduce traffic involved in responding to the query. In that case, failures may be contained and/or handled at the partition level. Also, one can give permissions at the granularity of a single partition of the overall dataset, for better internal and external protection.

To reveal meaningful information from such large quantities of data, data management systems often allow users to generate queries. A query is a request for data or information from a dataset or combination of multiple datasets. It can be as simple as "find the phone number of a person with employee ID 12345," or more complex like "find the average year-to-date salary of all employed people in a company between the ages 30 to 39 that speak Japanese."

Since dataset structures are often large and/or complex, in many cases, the input data for a query can be collected from a dataset by accessing it in different ways, through different data-structures, and in different orders. Furthermore, the processing of that input data might occur by executing operators in different orders or with different dependencies. Each different way of generating the query results typically requires different processing time. Processing times of the same query may have large variance, from a fraction of a second to hours, depending on the way selected, especially as the dataset grows larger. Query optimization is the process of finding the way to process a given query in less time, because the large possible variance in time justifies performing optimization.

The data management system 560 (hereinafter may also be referred to as the "dataset-level data management system" or simply the "system") may be a computing system such as the computing system 100 of FIG. 1, or an executable component 106 running on that computer system 100. Likewise, each partition of the dataset may also operate with the assistance of a computing system such as computer system 100 of FIG. 1, or an executable component 106. Each of these computing systems or executable components (hereinafter may be referred to as partition-level data management systems) may be located locally or remotely from a user and/or any partition of the dataset.

Figure 6:
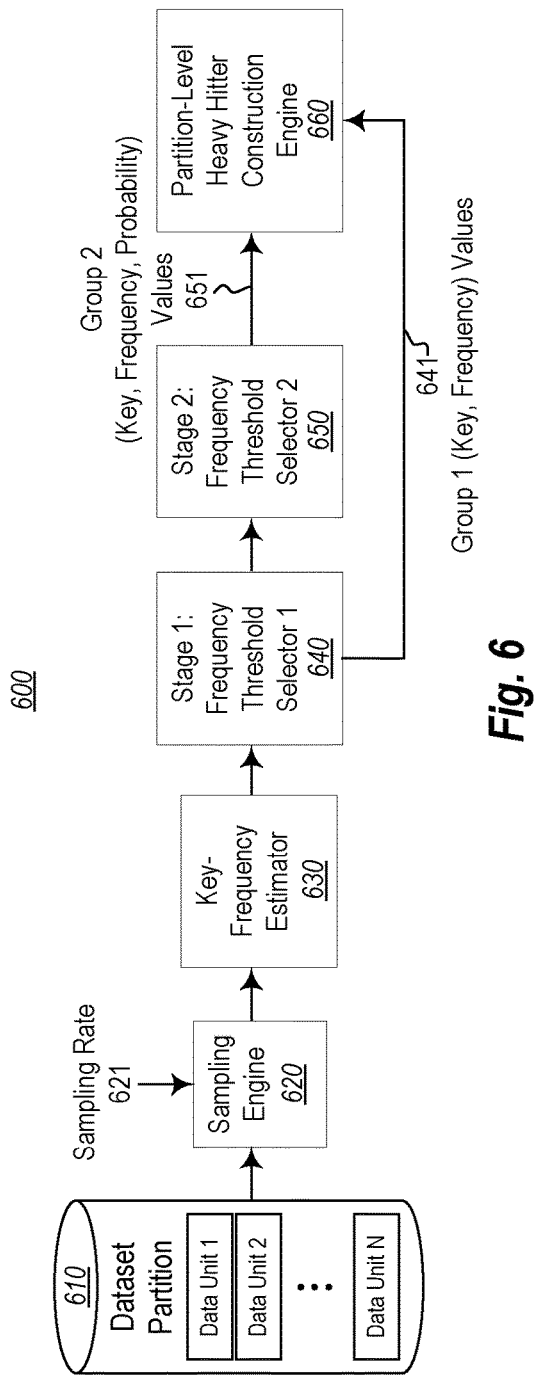
FIG. 6 illustrates a partition-level heavy hitter estimation environment, in which a partition-level heavy hitter key-frequency summary is estimated using a two-stage estimation process.

FIG. 6 illustrates a partition-level heavy hitter estimator 600, in which a partition-level heavy hitter key frequency summary is estimated using a two-stage process and using sampling of a dataset partition 610. The dataset partition 610 may be one of the multiple partitions of a dataset 510, as illustrated in FIG. 5. The dataset partition 610 includes multiple data units, e.g., data unit 1, data unit 2, and data unit N. The ellipsis and letter "N" represent that there may be any whole number (N) of data units in the dataset partition 610. The data units 1 to N of the dataset partition 610 are input into a sampling engine 620. The sampling engine 620 samples the data units 1 to N at a sampling rate 621 and outputs a set of sampled data units. For instance, if the sampling rate 621 is 1/1000, and the total number of data units in dataset partition 610 is N, the number of sampled data units is N/1000.

The purpose of sampling is to select a subset of the dataset so that the system may ask queries about the selected subset and have the answers be statistically representative of the dataset as a whole. There are many techniques that may be used to generate such representative subsets of the dataset. One approach is to generate a random number from 0 to R, corresponding to each data unit, and then select the data unit corresponding to the random number that is 0, such that the law of large numbers will assure that the selected subset of data unit will be a fraction close to 1/Rth of the total data units in the dataset. Another approach is to select every Rth data unit in the dataset, such that, the selection of the subset of the data units will also be a fraction close to 1/Rth of the total data units in the dataset. The two methods described here are merely examples. Other sampling techniques may also be implemented herein to result in a set of sampling data units with a sampling rate 1/R, statistically representing the dataset as a whole.

Figure 7:
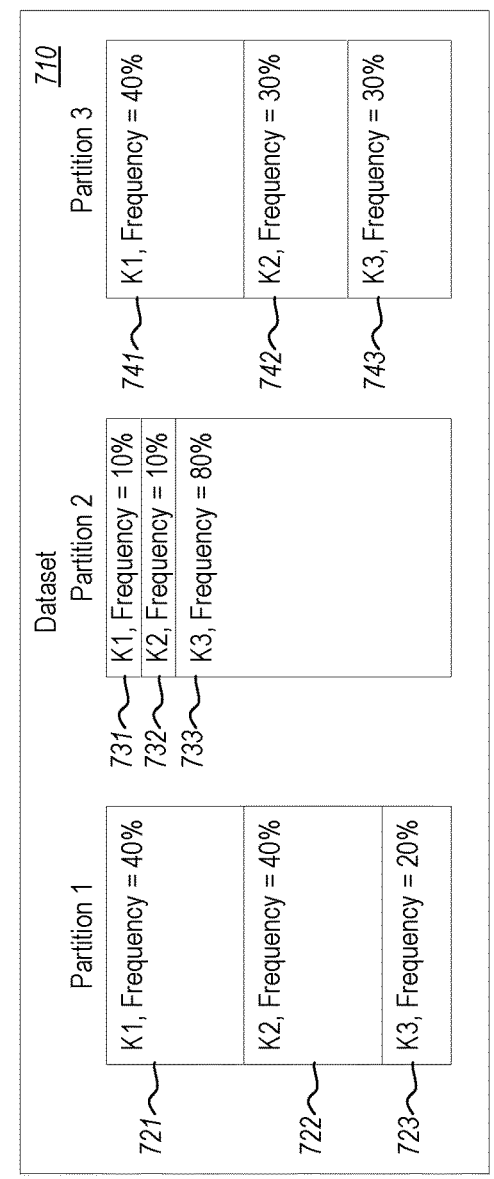
FIG. 7 illustrates a distributed database environment, in which a traditional partition level heavy hitter selector may result in a biased result.

After sampling, the sampled data units (e.g., N/1000 data units in the example) are input into a key-frequency estimator 630. The key-frequency estimator 630 estimates the frequency of each of the keys of the data units among the sampled data units. Assuming the data units are randomly distributed, the estimated frequency of each of the keys would represent all the data units of the dataset partition 610 with a bounded error. An example of the key-frequency estimator 630 is illustrated in FIG. 7 and described with respect to FIG. 7 below.

Referring back to FIG. 6, after the key-frequency estimator 630 estimates the key-frequency pairs based on each of the sampled data units, the key-frequency pairs then go through a two-stage selector process. The first stage selector 640 compares each of the key-frequency pairs and decides whether the corresponding key-frequency satisfies a first threshold requirement. If the key-frequency value satisfies the first threshold requirement, the first stage selector records the key-frequency pair. Accordingly, after each of the sampled data units go through the first stage key-frequency selector 640, a group of key-frequency pairs 641 that satisfies the first threshold requirement are recorded. Hereinafter, this group of key-frequency pairs 641 is referred to as "group 1 key-frequency pairs".

The key-frequency pairs that are not selected by the first stage selector are then accessed by a second stage key-frequency selector 650. The second stage key frequency selector 650 compares each of the key-frequency pairs and decides whether the corresponding key frequency satisfies a second threshold requirement (that is of course lower than the first threshold requirement). Accordingly, after the sampled data units go through the second stage key-frequency selector 650, a second group of key-frequency pairs 651 (hereinafter referred to as "group 2 key-frequency pairs") are recorded.

Figure 9:
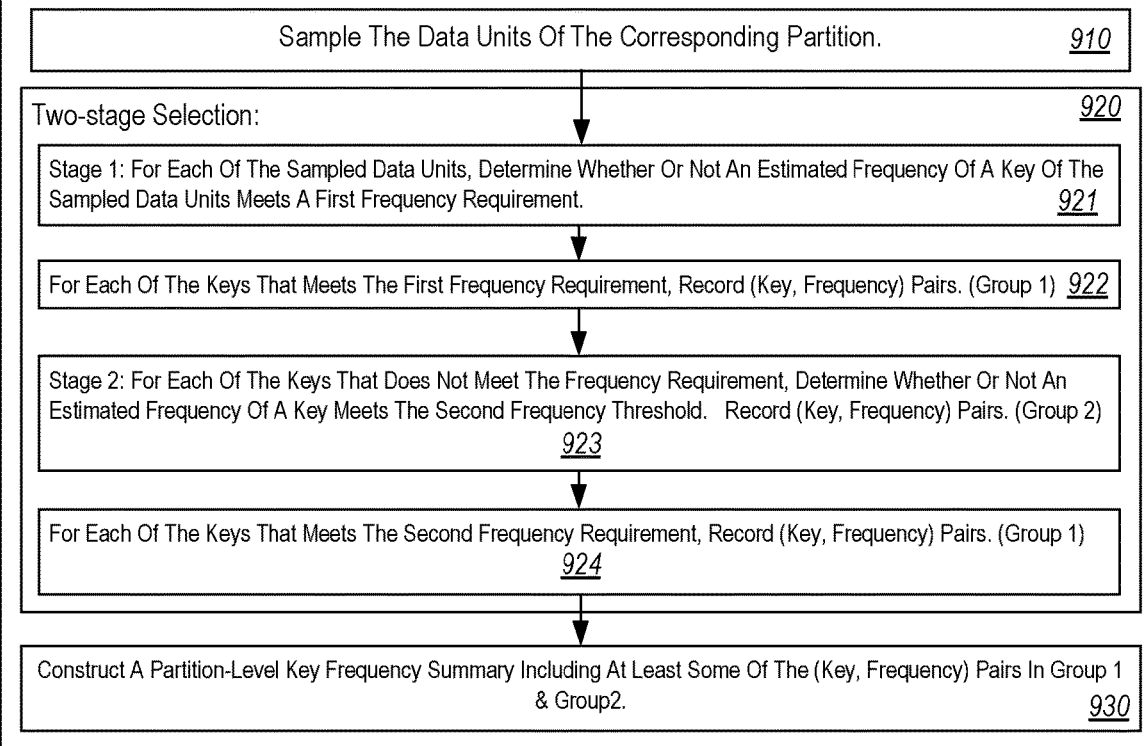
FIG. 9 illustrates a method of constructing a partition-level heavy hitter summary for query optimization.

The group 1 key-frequency pairs 641 and the group 2 key-frequency pairs 651 are then input into a partition-level heavy hitter constructor 660. The partition-level heavy hitter constructor 660 evaluates both the group 1 key-frequency pairs 641 and the group 2 key-frequency pairs 651 to construct a partition-level heavy hitter summary. The two-stage heavy hitter selection process is illustrated in FIG. 9, which is described further below.

The two stage key selectors solve the problem of biased estimation that ignores those keys with low partition-level frequencies, but high dataset-level frequencies. Traditionally, a partition-level sampling only records the keys with high partition-level frequency values, and ignores the rest of the keys. For instance, as illustrated in FIG. 7, a dataset 710 includes three partitions, partition 1, partition 2 and partition 3. There are three keys in each of the partitions, k1, k2 and k3. It is assumed that the user indicates or the system selects a threshold frequency of 35%, i.e., if the key frequency value is higher than 35%, the key-frequency pair would be deemed as a heavy hitter and be selected.

In partition 1, keys k1 721 and k2 722 both have a frequency value of 40%; and key k3 723 has a frequency value of 20%. In such a case, the sampling process of partition 1 conventionally is likely to result in a partition-level heavy hitter summary that only includes k1 and k2, because k1 721 and k2 722's partition-level frequencies are more than the threshold 35% and k3 723's partition-level frequency is less than the threshold 35%. Similarly, the sampling process of partition 2 is likely to result in a partition-level heavy hitter summary that only includes k3 733, because k1 731 and k2 732's partition-level frequencies are only 10%, which is less than the threshold 35%, and k3 733's partition-level frequency is 80%, which is more than the threshold 35%; and partition 3's partition-level heavy hitter summary would likely only include k1 741.

Such partition-level heavy hitter summaries will be biased because in the dataset level, k3 has the highest frequency rate. However, k3 is only included in the heavy hitter summary of partition 2; k2 has the lowest frequency rate, but is included in the heavy hitter summary of partition 1; and k1 does not have the highest frequency rate, but is included in both partition 1 and partition 3's heavy hitter summaries.

As the principle described herein indicates, the two stage key selectors not only record the keys with high partition-level frequency values in group 1, but also record the keys with low partition-level frequency values and possible high dataset-level frequency values in group 2.

Figure 8:
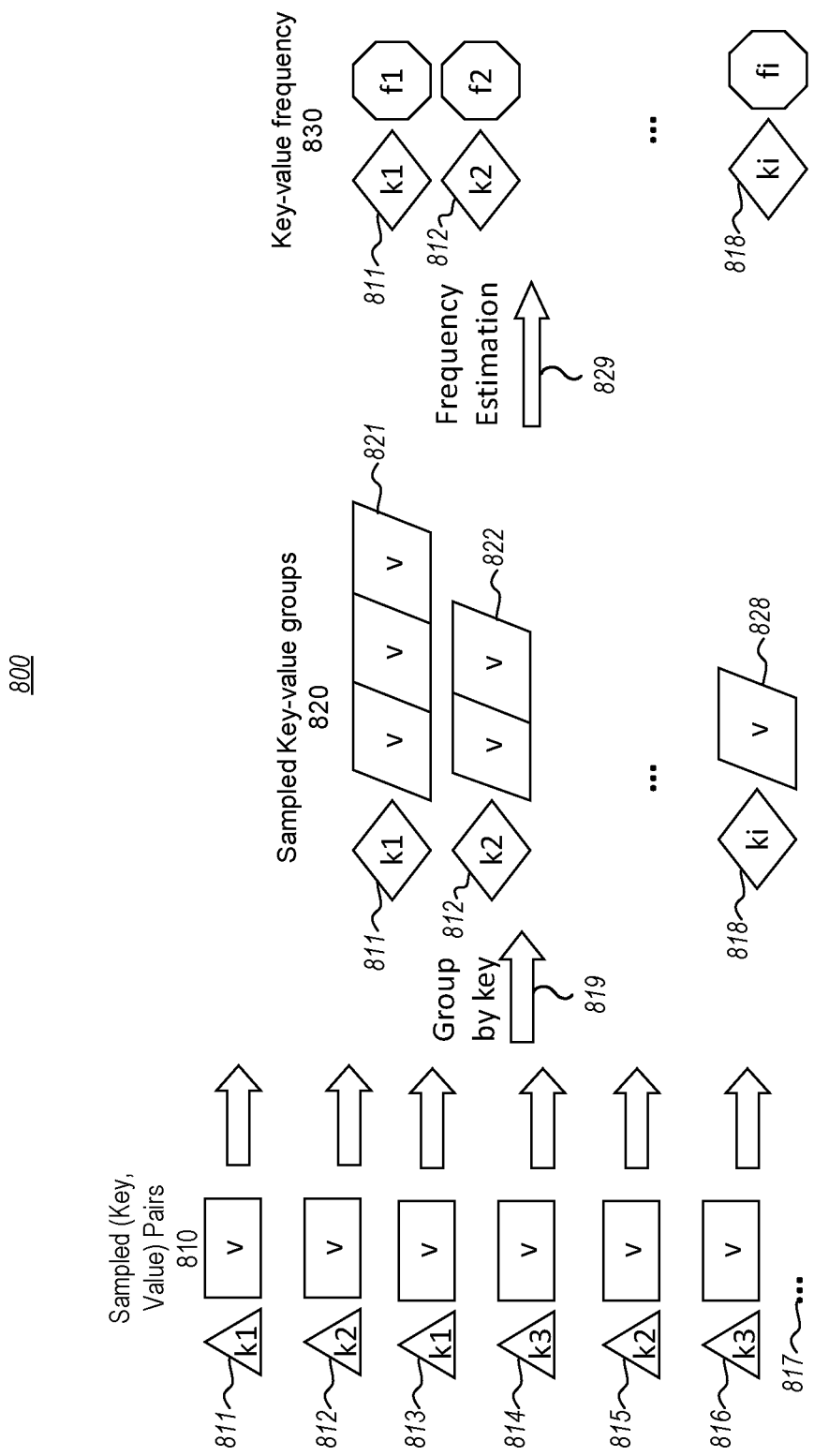
FIG. 8 illustrates a key frequency estimator environment, in which a frequency is estimated for each key based on the sampled data units.

FIG. 8 further illustrates an example key frequency estimator data flow such as might occur in the key-frequency estimator 630 of FIG. 6. In the key frequency estimator flow 800, for each key, the key frequency is estimated based on the sampled data units. The data management system turns the data units into a sequence of key-value pairs. The method that the key-value pairs are produced from the input data is determined by the design of the data management system. The key-value pairs from each partition may be collected before or after the act of sampling. As illustrated in FIG. 8, key-value pairs 811 to 818 are the key-value pairs after the sampling. The ellipsis and the letter "n" represent that there may be any whole number (n) of keys in the sampled data units.

The key-value pairs are then grouped and sorted by keys (represented by arrow 819). For instance, as illustrated in FIG. 8, after sorting, the key frequency estimation data flow 800 determines that there are three key-value pairs 821 that have the key k1 811, that there are two key-value pairs 822 that have the key value k2 812, and that there are is one key-value pair 828 that has the key value ki 818. The ellipsis and the letter "i" represent that there may be any whole number (i) of keys among the sampled data units.

Then, based on the total number of key-value pair groups that have the same key, as represented by arrow 829, the key frequency data flow estimates the partition-level frequency f1, f2 and fi of each respective key k1, k2 and ki. Assuming there are a total of N data units in the partition, and the sampling rate is p, there are only N*p (hereinafter referred to as n) data units sampled. Among the total n (=N*p) sampled data units, there are three data units 821 that share the key k1. Accordingly, the estimated frequency of the key k1 would be 3/n (=3/(N*p)). For example, if the sampling rate is 1/1000, the estimated frequency of the key k1 would be 3/(N*1/1000)=3000/N.

FIG. 9 is a flowchart of a method 900 for building a partition-level key-frequency summary using the two-stage key-frequency selectors 640 and 650 of FIG. 6. This method 900 may be performed in order to obtain a partition-level heavy hitter summary for each of the multiple partitions 1 through M contained in the dataset 510 of FIG. 5. As explained earlier in FIG. 6, the method 900 may be performed by partition-level data management systems. Each partition-level data management system may be a computing system 100 of FIG. 1, or an executable component 106 running on that computing system 100. Also, each partition-level data management system may be local to or remote from each partition of a dataset, the dataset-level data management system, and/or a user's computing system.

For each of the multiple partitions, the partition-level data management system first samples 910 the data units of the corresponding partition, and then conducts a two-stage selection process 920. During the first stage, the system determines whether each of the sampled key-frequency pairs meets a first frequency requirement (act 921). For the sampled key-frequency pairs that meet the first frequency threshold, the system records (act 922) the key-frequency pairs (hereinafter referred to as group 1 key-frequency pairs).

For the sampled key-frequency pairs that do not meet the first frequency threshold, the computing system further evaluates each of the key-frequency pairs to determine whether each of them meets a second frequency threshold (act 923). For each of the keys that meets the second frequency requirement, the system records (act 924) the key-frequency pairs (hereinafter referred to as a group 2 key-frequency pairs). Then, the computing system constructs a partition-level heavy hitter summary including at least some of the key-frequency pairs in the group 1 and some of the key-frequency pairs in group 2.

In some embodiments, the first threshold requirement may be a pre-determined heavy hitter threshold frequency $\Theta$. The group 1 key-frequency pairs include all the key-frequency pairs that have a frequency no less than $\Theta$. For each of the key-frequency pairs that have a frequency (f) lower than $\Theta$, the system replaces the estimated frequency for each of the keys to $\Theta$, and estimates that the probability of the frequency of the key being no less than $\Theta$ is f/$\Theta$. Accordingly, the key-frequency pairs (that are not in group 1) are transformed to the key-probability pairs. The computing system may record all of the key-probability pairs in group 2. Alternatively, the computing system may further filter the key-probability pairs based on their probability values and only record key-probability pairs that have a probability value higher than a pre-determined threshold probability (e.g., 10%).

Figure 10:
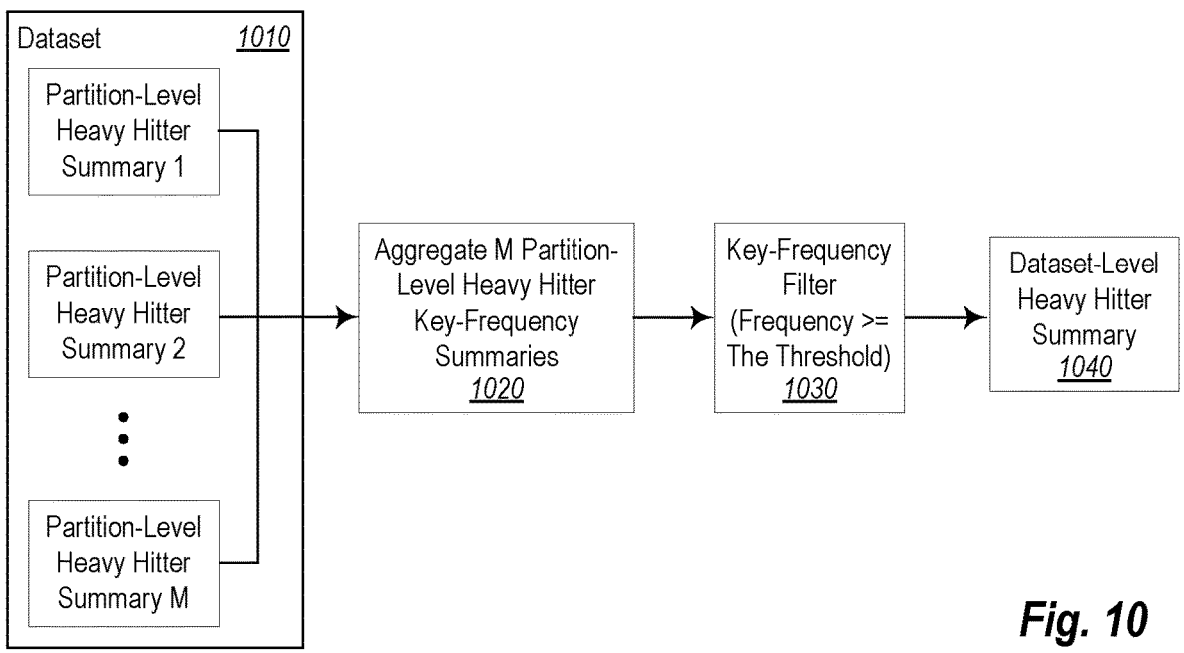
FIG. 10 illustrates a dataset-level heavy hitter estimation environment, in which a dataset-level heavy hitter summary is constructed based on the partition-level heavy hitter summaries.

After the partition-level heavy hitter summaries are constructed, the dataset-level data management system aggregates each of the partition-level heavy hitter summaries to construct a dataset-level heavy hitter summary. FIG. 10 illustrates a method 1000 of constructing dataset-level heavy hitter estimation using the partition-level heavy hitter key-frequency summaries. As mentioned in FIG. 5, the dataset-level data management system may be a computing system 100 of FIG. 1 or an executable component 106 running on that computing system 100. The dataset-level data management system may be local to the user and/or some partition (s) of the dataset, or a remote server.

In FIG. 10, partition-level heavy hitter summaries 1 to M may be constructed via the method or system described in FIGS. 6 to 9. The ellipsis and the letter "M" represents that there may be any whole number (M) of partitions contained in the dataset 1010. Accordingly, there are a total of M heavy hitter summaries 1 to M that have been constructed by the partition-level data management systems, each of which corresponding to each of the partitions.

The dataset-level data management system receives and aggregates the M partition-level heavy hitter summaries 1 to M (act 1020). In some embodiments, the total number of data units in each partition may be different. In such cases, each of the partition-level frequency needs to be converted to a dataset-level frequency before being combined. For instance, assuming, there are total M data units in the dataset, n1 of which are contained in partition 1, and n2 of which are contained in partition 2. The partition-level frequency of a key in partition 1 is estimated as f1; and the partition-level frequency of a key in partition 2 is estimated as f2. The frequency f1 is converted to f1*n1/M, and the frequency f2 is converted to f2*n2/M to reflect the frequency in the dataset level, before being aggregated.

For each of the keys, after converting each of the partition-level frequency to the dataset-level frequency, the system may sum up the frequency value in each of the partition-level heavy hitter summaries to generate a final dataset-level frequency value of the corresponding key. In some other embodiments, the frequency values of each of the partition-level heavy hitter summaries may be weighed before summing up.

After the dataset-level key-frequency pairs are generated, the system may further filter the keys that have frequencies higher than the pre-determined threshold Θ as the heavy hitters (act 1030). Finally, the system constructs a heavy hitter summary including each of the filtered keys and their corresponding frequencies (act 1040).

In some embodiments, as described above in FIG. 9, the partition-level heavy hitter summary may include two groups of keys. Group 1 may include key-frequency pairs that have frequencies higher than the threshold Θ; and group 2 may include key-probability pairs that have probabilities higher than a threshold P. The act of aggregating may include aggregating group 1 key-frequency pairs and group 2 frequency-probability pairs separately. For each of the key-frequency pairs in group 1, the system may convert the partition-level frequencies to dataset-level frequencies and sum them up, similarly to the process described above. Accordingly, for each of the key-frequency pairs in group 1, the act of aggregating would generate a dataset-level key-frequency pairs. Then, the system may further filter and record the keys that have a frequency value higher than the threshold Θ.

For each of key-probability pairs in group 2, the system may convert partition-level probabilities to dataset-level probabilities and sum them up. Accordingly, for each of key-probability pairs in group 2, the act of aggregating would generate a dataset-level key-probability pairs. Since the probability is the estimated probability of a key value having a frequency no less than the threshold Θ, the system may further filter and record the keys that have a probability value higher than 100% or any pre-determined threshold probability P.

Thus, the data management system constructs a dataset-level heavy hitter summary, which includes two groups of keys. In group 1, the dataset-level heavy hitter summary includes key-frequency pairs that have frequency values higher than the threshold Θ; and in group 2, the dataset-level heavy hitter summary includes key-probability pairs that have probabilities higher than a threshold probability P, in which the probability is the probability of a key-frequency being no less than a threshold Θ.

In general, the partition-level and the dataset-level heavy hitter summaries are combinable. This is helpful when the size of dataset or the number of partitions increases. However, when the size of dataset or the number of partitions increases substantially or higher than a pre-determined threshold number, the previously generated heavy hitter summaries may become less accurate. In such cases, the system may recommend re-constructing a heavy hitter summary to reflect the augmented dataset.

In some embodiments, the system may repeat the same process illustrated in FIGS. 6 to 9 and re-construct each dataset-level heavy hitter summary using a lower sampling rate. For instance, the partition-level data management system conducts a two-stage selection process. The first stage selector selects a first set of key-frequency pairs recorded in group 1. The second stage selector may select a second set of key-probability pairs recorded in group 2.

In some other embodiments, the system may further sample the previously sampled data units or key frequency pairs.

Figure 11:
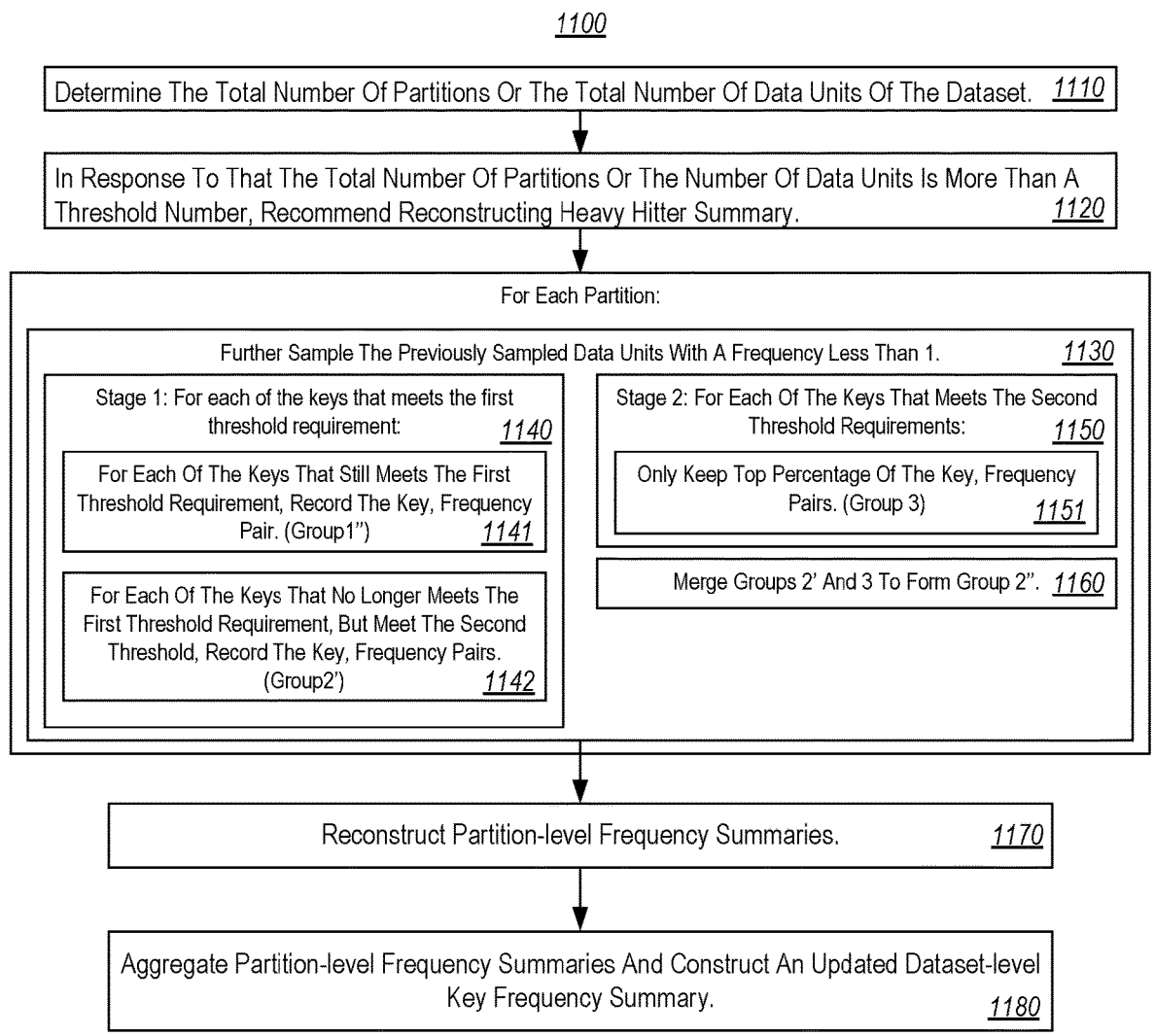
FIG. 11 illustrates a method of re-constructing a dataset-level heavy hitter summary, when the size of the dataset increases.

FIG. 11 illustrates a method 1100 of re-constructing a dataset-level heavy hitter summary, when the size of the dataset increases. The dataset-level data management system determines (act 1110) the total number of partitions contained in the dataset. When the total number of the partitions or total number of data units increases to a pre-determined threshold number, the system may recommend (act 1120) re-constructing the heavy hitter summary.

Then, the system re-samples (act 1130) the keys that are included in group 1 and group 2 at a re-sampling rate less than 1. Therefore, only a portion of the key-frequency pairs will be left after the re-sampling. For instance, the re-sampling rate may be 1/2. When the re-sampling rate is 1/2, for key frequency pairs that have a high frequency value, the re-sampled key-frequency pairs should still be similar to the previous key frequency value. However, for the key frequency pairs that have extremely low frequency value, the re-sampled frequency pairs may be eliminated or may result in a different key frequency value.

For example, k1 group 821 in FIG. 8 used to include 3 data units. After a random re-sampling at a rate 1/2, there may be only one or two data units left in the k1's key-value group. If one data unit is left after the re-sampling, the frequency of k1 would reduce; if two data units are left after the re-sampling, the frequency of k1 would increase. Similarly, if the key frequency is very low, the key-frequency pair may be completely omitted after the re-sampling. For instance, there is only one data unit in the key-value group of ki as illustrated in FIG. 8. After the random re-sampling at rate 1/2, there may be one or zero data unit left in the ki group. If zero data unit is left after the re-sampling, the frequency of ki would become 0, and key ki will be dropped from the key-frequency group. If one data unit is left after the re-sampling, the frequency of k1 would double. Statistically, even though half of the key value groups that only contain one data unit will be estimated as a higher frequency rate after the re-sampling at the frequency rate 1/2; half of these key value groups will be estimated as 0% frequency and dropped. Therefore, the re-sampling is likely to generate a smaller group of key-frequency pairs. The frequency value of most of the key-frequency pairs should be the similar to the previously estimated value; however some key-frequency pairs with lower frequency values may change after the re-sampling.

In some embodiments, as illustrated in FIGS. 6 to 9, the partition-level heavy hitter summaries may include two groups of keys (group 1 and group 2). In such case, the re-sampling may be conducted separately in each of the group 1 and group 2.

After re-sampling the group 1 key-frequency pairs (act 1140), the partition-level data management system reapplies the two-stage selection process against the re-sampled key-frequency pairs (hereinafter referred to as group 1″). The first stage selection selects the keys that meet the first threshold requirement, and record the selected key-frequency pair in group 1″ (act 1141). The second stage selects the keys that no longer meet the first threshold requirement, but meet the second threshold requirement, and record the selected key-frequency pairs in group 2' (act 1142).

In some embodiments, the first threshold requirement is the pre-determined threshold Θ. Accordingly, group 1" includes all the key-frequency pairs that have frequencies higher than the pre-determined threshold Θ. For the key-frequency pairs that are less than the pre-determined threshold Θ, the system replaces the frequency value (f) to Θ, and estimate the probability of the key frequency being no less than Θ as f/Θ. The system may record each of key-probability pairs in group 2'. Alternatively, the system may set a threshold P as the second frequency threshold, and only record key-probability pairs that have probabilities higher than the threshold P.

Similarly, the re-sampling applies to the previous key-probability pairs in group 2 to generate a sub-set of the key-probability pairs (hereinafter referred to as group 3) (act 1150). In some embodiments, the system may set another threshold to only retain a portion of the keys in group 3 (act 1151). For instance, the system may select to retain the portion of the keys that corresponds to the re-sampling rate. If the re-sampling rate is 1/2, and there are total m keys included in the original group 2. The system may only retain top m*1/2 keys in group 3.

Then, the system may combine the keys in group 2' and group 3 into a new group (hereinafter referred to as group 2") (act 1160). Accordingly, the system reconstructs the partition-level heavy-hitter summary to include key-frequency pairs of group 1" and key-probability pairs of group 2" (act 1170).

Finally, similarly to the process illustrated in FIG. 9, the dataset-level data management system may aggregate the reconstructed partition-level heavy-hitter summaries to an updated dataset-level heavy hitter summary (act 1180).

In some embodiments, the total number of data units may not be known. In such cases, the sampling may be a progressive sampling. For instance, progressive sampling may occur at a partition level. As an example, suppose that the system wants to create a sample of fixed size (k) for each partition based on a total number (N) of data units in the partition that is not known ahead of time. The number N of data units in the partition ends up being less than k, then all of the data units may be provided for key-frequency pair generation. Generally speaking, (for m being any whole number greater than 1; and p being the sampling rate that samples k random data units from a dataset with n data units), two sets of samples by two sampling rates are maintained; as more data are inserted into the partition, the sampling rates are reduced so as the samples and the smaller sampling rate is always half of the bigger counterpart. When the encountered data set reaches size $n*2^m$, the sample set at sampling rate $p*2^{-(m-1)}$ becomes irrelevant, and a new data set of sampling rate $p*2^{-(m+1)}$ is created by randomly dropping half of the data set of the sampling rate $p*2^{-m}$. The maintained data sets are then of sampling rates $p*2^{-m}$ and $p*2^{-(m+1)}$. If the total data set size (N) ends between $n*2^m$ and $n*2^{(m+1)}$, the sample set sampled at rate $p*2^{-m}$ is used to obtain the final k-sized sample set. This is done by random sampling the sampled data by $p*2^{-m}$ with a sampling rate of $(n*2^m)/N$. On expectation, this samples k data units statistically from the insertion. For the table that has/partitions, assume partition i reports k samples from N_i data units inserted to the partition; the total number of data units for the table is T=SUM(N_i), with i=1 ... l. To obtain the table level k samples, the k samples from partition i is randomly sampled by a sampling rate q_i=N_i/T. Statistically, this leads to k surviving samples for the table after aggregating all surviving samples from each partition. The final samples are used to construct the skew information for the table.

A more concrete example is provided. Suppose that the number of samples desired for a partition of unknown size is 1000 (i.e., k is 1000). When the encountered data set is reaches size 1000 (N=1000), two sampled sets are created, a first having the complete data set (sampling rate p=100%) and second sample data set is derived from that complete data set by dropping half of the sample randomly (sampling rate is p/2=50%). The two data sets of sampling rates p and p/2 continues to be maintained and grown as new data units of the partition are encountered. If the total data set size (N) ends between 1000 and 2000, the sample set sampled at rate p is used to obtain the final k-sized (1000) sample set. This involves randomly dropping N-k samples from that data set. When the encountered data set reaches 2000, the sample set at sampling rate p (100%) becomes irrelevant, and a new data set of sampling rate p/4 (25%) is created by randomly dropping half of the data set of the sampling rate p/2. The maintained data sets are then of sampling rates p/2 and p/4. If the total data set size (N) ends between 2000 and 4000, say 3000, the sample set sampled at rate p/2 is used to obtain the final k-sized sample set. This involves randomly sampling 2000/3000 data units from that samples associated with p/2. This continues recursively until the end of the data to be inserted into the partition is encountered. Assume there are two partitions for the table, the first partition reports k=1000 samples, from 3000 data units; and the second partition reports k=1000 samples from 4000 data units. To obtain k=1000 samples for the table with 3000+4000=7000 data units. The samples from the first partition is re-sampled with a random sampling rate of 3000/7000, and the samples from the second partition is sampled with a random sampling rate of 4000/7000. On expectation, 3/7 of the k samples from the first partition would survive the re-sampling, and the same for 4/7 of k samples for the second partition. Hence, the table retains k samples from 2 partitions after re-sampling. From the samples, the [key, frequency] pair is constructed to represent the skew information of the table.

As the principles described herein, when a user requests a query, the dataset-level data management system may access the dataset-level heavy hitter summary. Often, the system may estimate the query result based on the heavy hitter summary. For example, in a grocery store, each customer has a basket containing a set of items. There are a large number of customers. The number of customers is so big that the data often cannot fit in RAM or any single storage of the computing system. Also, a major chain grocery store might sell thousands of different items and collect data about millions of market baskets. The data of each customer's basket is stored in a dataset. Different store's customer's data is stored in different partitions. An item that appears in many baskets is considered to be "frequent." The data management system may define if an item's frequency is higher than a threshold frequency, the item is deemed as a heavy hitter. For example, ketchup is one of the heavy hitter items that people frequently purchase. If a store manager wants to know how many bottles of ketchup were sold in the past month, the data management system may use the heavy hitter summary to estimate the total bottles of ketchup sold in the past month and return the estimated number to the store manager with an estimated maximum error rate. If the error rate is acceptable to the store manager, there is no need to access each data unit in the dataset to obtain an accurate answer.

The data management system may also predict the number of rows in the query result before generating the final result. The query optimizer may use these estimates and the heavy hitter summary to choose a plan for executing the query. For example, in a grocery store example, suppose the store manager wants to see all the purchase transactions that include bread, eggs, pasta and beef. In this example, suppose the keys "Bread", "Eggs", "Pasta" and "Beef" are all heavy hitters contained in the heavy hitter summary. For example, based on the heavy hitter summary, the purchase frequency of bread is 50%, the purchase frequency of eggs is 40%, the purchase frequency of pasta is 30%, and the purchase frequency of beef is 10%.

Figure 13A:
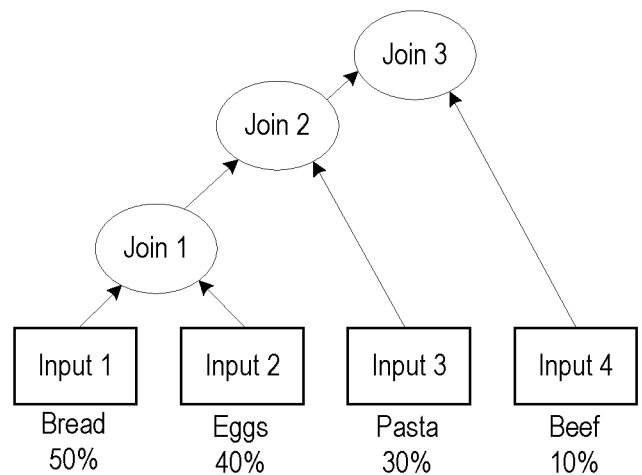
FIGS. 13A and 13B illustrate different example candidate query trees that are structurally similar to FIG. 12A, but in which the inputs are reordered in order to determine how to best handle different heavy hitters.
Figure 13B:
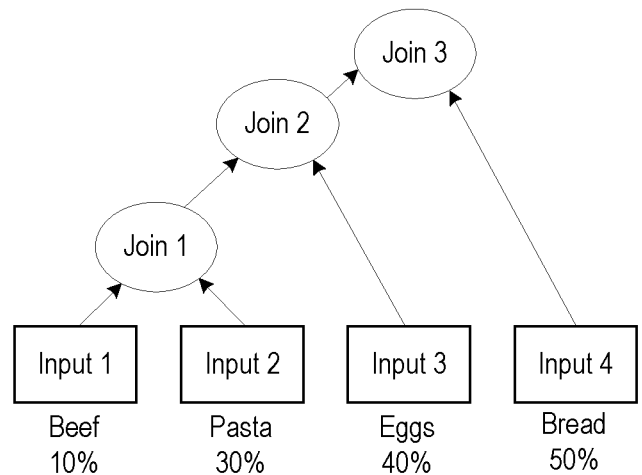

FIGS. 13A and 13B illustrate two candidate query trees 1300A and 1300B. Both of the candidate query trees can output what the store manager requested. However, the sequences of each leaf node of the query trees are different. The query tree of FIG. 13A inputs bread first, then eggs, pasta, and beef. The query tree of FIG. 13B inputs beef first, then pasta, eggs, and bread. Assuming the total number of data units in the dataset is N, applying the same equation as previously in FIG. 12A (because the overall structure of the query tree 1300A is the same as the query tree 1200A), the total number of computations required for the query tree 1400A is: (40%*50%+30%*40%*50%+10%*30%*40%*50%)*N*N=26.6%*N; and the total number of computations required for the query tree 1400B is: (30%*10%+40%*30%*10%+50%*40%*30%*10%) *N*N=4.8%*N.

Accordingly, the total number of computations required for query 1300A is 26.6%*N*N, and the total number of computation required for query 1300B is 4.8%*N*N. Because the total number of computations required by query tree 1300B is much less than the total number of computations required by query tree 1300A, the query optimizer is likely to select the query tree 1300B as the optimized query tree, and implement a query plan based on the query tree 1300B.

Additionally, the dataset-level heavy hitter summary may also be important to characterize data and/or discover association rules. For example, in the grocery store, the data management system may further define that if a frequency of a set of items is higher than a threshold frequency, the set of items would be heavy hitters. By finding frequent item sets, a retailer can learn what is commonly bought together. Especially important are pairs or larger sets of items that occur much more frequently than would be expected were the items bought independently. For instance, the heavy hitter summary might discover that many people buy hot dogs and mustard together.

Grocery store dataset management described here is only one example of the applications that heavy hitter summaries may be implemented. There are many other practical applications where heavy hitter summaries may be implemented, including, but not limited to, data mining and query optimization.

Furthermore, the principles described herein are proven to yield estimations with a bounded error rate. For instance, a bounded error rate may be provided via a user indication or chosen by the data management system. Based on the bounded error rate and the number of partitions or the total number of data units contained in the dataset, the data management system may determine the first frequency threshold, the second frequency threshold, and/or the sampling rate.

Thus, an effective mechanism has been described for estimating a partition level and dataset-level heavy hitter summary in a distributed data management environment within a bounded storage overhead and bounded error rate. Unbiased samplings and sub-samplings are conducted in the partition level to construct the partition level heavy hitter summaries. The partition level heavy hitter summaries may be combined to construct a dataset-level heavy hitter summary. The dataset-level heavy hitter summary may also be combinable with one or more additional dataset-level heavy hitter summaries. The user can indicate the tolerable error rate, the data management system may determine the sampling rate based on the indication of the tolerable error rate, such that the estimated dataset-level heavy hitter summary is accurate to the bounded tolerable error rate.

Using the principles described herein, the user can rely on the computing system to estimate heavy hitters of a distributed dataset. The data management system may use the estimated heavy hitters to optimize query trees. Furthermore, the data management system may use the estimated heavy hitters to estimate outputs of certain queries. Since the heavy hitter summary is smaller in size and faster to access, it would save the computation hardware resources and the user's time to generate estimated outputs for queries. If the estimated outputs are sufficiently accurate, the data management system does not need to further access the data units of the datasets.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processors; and
one or more computer-readable media having thereon computer-executable instructions that are structured such that, when executed by the one or more processors, cause the computing system to perform a method for building a heavy hitter summary for query optimization and by at least causing the computing system to perform the following:
sample each of a plurality of partitions of a dataset, wherein each of the plurality of partitions of the dataset comprises a plurality of data units, and each of the plurality of data units comprises a key;
for each of the plurality of partitions of the query dataset, perform a two-stage heavy hitter estimation process comprising:
a first stage in which, for each of the sampled data units, determine whether an estimated frequency of a key of the sampled data units meets a first stage frequency threshold; and
a second stage in which, for each of the keys of the sampled data units that has not been determined to satisfy the first stage frequency threshold, determine whether an estimated frequency of a key of the sampled data units meets a second stage frequency threshold; and
construct a partition-level heavy hitter summary for the corresponding partition of the dataset, wherein the partition-level heavy hitter summary comprises all the keys for the data units in the corresponding partition that satisfy the first stage frequency threshold in the first stage, and all the keys for the data units in the corresponding partition that satisfy the second stage frequency threshold in the second stage.

2. The computing system of claim 1, wherein constructing the partition-level heavy hitter summary for the corresponding partition of the dataset comprises:
building a partition-level heavy hitter frequency structure that includes 1) each of at least some of the keys included within the partition-level heavy hitter summary, and 2) the corresponding estimated frequency of the key.

3. The computing system of claim 2, wherein the method further comprises:
for each of at least some keys included within one or more of the partition-level hitter summaries, estimating a dataset-level frequency of the key;
generating a dataset-level heavy hitter frequency structure that includes 1) at least some of the keys for which a dataset-level frequency has been estimated, and 2) the corresponding estimated dataset-level frequency of the corresponding key.

4. The computing system of claim 3, wherein the method further comprises the following in response to accessing a compiled query tree:
generating a candidate query tree corresponding to the compiled query tree, wherein at least some of the keys included in the dataset-level heavy hitter frequency structure are associated with at least some of the nodes of the candidate query tree;
using the dataset-level frequency data structure to estimate dataset-level frequencies of each of the at least some of the keys associated with the at least some of the nodes of the candidate query tree; and
determining whether the candidate query tree is an optimized form of the compiled query tree based at least in part on the dataset-level frequencies of each of the at least some of the keys associated with the at least some of the nodes of the candidate query tree.

5. The computing system of claim 3, wherein the method further comprises:
providing a bounded error rate;
determining the number of partitions; and
determining the first stage frequency threshold and the second stage frequency threshold based on the number of partitions of the dataset and the bounded error rate, such that the resulting estimation of each of the dataset-level frequency of the keys is within the bounded error rate.

6. The computing system of claim 5, wherein the number of data units in the dataset and the number of partitions of the dataset change over time.

7. The computing system of claim 6, the sampling of each of a plurality of partitions of a dataset occurring at a first sampling rate, wherein the method further comprises:
in response to a determination that the number of partitions of the dataset reaches a threshold number;
for each of the plurality of partitions of the dataset, resampling the corresponding partition of the dataset using a second sampling rate, wherein the second sampling rate is lower than the first sampling rate;
re-performing the two-stage heavy hitter estimation process at the second sampling rate; and
re-constructing a partition-level heavy hitter summary for the corresponding partition of the dataset in response to the re-performing of the two-stage heavy hitter estimation process.

8. The computing system of claim 7, wherein the second sampling rate is one half or less of the first sampling rate.

9. The computing system of claim 6, wherein the method further comprises:
in response to a determination that the number of partitions of the dataset reaches a threshold number,
further sampling the sampled data units of the corresponding partition using a sub-sampling rate;
re-performing the two-stage heavy hitter estimation process at the sub-sampling rate; and
re-constructing a partition-level heavy hitter summary for the corresponding partition of the dataset in response to the re-performing of the two-stage heavy hitter estimation process.

10. The computing system of claim 9, wherein the sub-sampling rate is one half or less.

11. A method for building a heavy hitter summary for query optimization, using a computing device, the method comprising:
sampling each of a plurality of partitions of a dataset, wherein each of the plurality of partitions of the dataset comprises a plurality of data units, and each of the plurality of data units comprises a key;
for each of the plurality of partitions of the query dataset, performing a two-stage heavy hitter estimation process comprising:
a first stage in which, for each of the sampled data units, determine whether an estimated frequency of a key of the sampled data units meets a first stage frequency threshold; and
a second stage in which, for each of the keys of the sampled data units that has not been determined to satisfy the first stage frequency threshold, determine whether an estimated frequency of a key of the sampled data units meets a second stage frequency threshold; and
constructing a partition-level heavy hitter summary for the corresponding partition of the dataset, wherein the partition-level heavy hitter summary comprises all the keys for the data units in the corresponding partition that satisfy the first stage frequency threshold in the first stage, and all the keys for the data units in the corresponding partition that satisfy the second stage frequency threshold in the second stage.

12. The method of claim 11, wherein constructing the partition-level heavy hitter summary for the corresponding partition of the dataset comprises:
building a partition-level heavy hitter frequency structure that includes 1) at least some of the keys included within the partition-level heavy hitter summary, and 2) the corresponding estimated frequency of the key.

13. The method of claim 12, further comprising:
for each of at least some keys included within one or more of the partition-level hitter summaries, estimating a dataset-level frequency of the key;
generating a dataset-level heavy hitter frequency structure that includes 1) at least some of the keys for which a dataset-level frequency has been estimated, and 2) the corresponding estimated dataset-level frequency of the corresponding key.

14. The method of claim 13, further comprising the following in response to accessing a compiled query tree:
generating a candidate query tree corresponding to the compiled query tree, wherein at least some of the keys included in the dataset-level heavy hitter frequency structure are associated with at least some of the nodes of the candidate query tree;

using the dataset-level frequency data structure to estimate dataset-level frequencies of each of the at least some of the keys associated with the at least some of the nodes of the candidate query tree; and determining whether the candidate query tree is an optimized form of the compiled query tree based at least in part on the dataset-level frequencies of each of the at least some of the keys associated with the at least some of the nodes of the candidate query tree.

15. The method of claim 13, further comprising:
providing a bounded error rate;
determining the number of the partitions; and
determining the first stage frequency threshold and the second stage frequency threshold based on the number of partitions of the dataset and the bounded error rate, such that the resulting estimation of each of the dataset-level frequency of the keys is within the bounded error rate.

16. The method of claim 15, wherein the number of data units and the number of partitions of the dataset are changing.

17. The method of claim 16, wherein the sampling of each of a plurality of partitions of a dataset occurring at a first sampling rate, wherein the method further comprises:
in response to a determination that the number of partitions of the dataset reaches a threshold number;
for each of the plurality of partitions of the dataset,
resampling the corresponding partition of the dataset using a second sampling rate, wherein the second sampling rate is lower than the first sampling rate;
re-performing the two-stage heavy hitter estimation process at the second sampling rate; and
re-constructing a partition-level heavy hitter summary for the corresponding partition of the dataset in response to the re-performing of the two-stage heavy hitter estimation process.

18. The method of claim 11, wherein for at least one of the partitions, when a number of samples of the partition reaches a particular threshold, resampling is performed on the samples.

19. The method of claim 11, the resampling being recursively performed whenever the number of samples of the most recent resampling reaches the particular threshold.

20. A computer program product comprising one or more computer-readable storage media having thereon computer-executable instructions that are structured such that, when executed by one or more processors of the computing system, the computing system is caused to perform a method for building a heavy hitter summary for query optimization, and by at least causing the computing system to perform the following:
sample each of a plurality of partitions of a dataset, wherein each of the plurality of partitions of the dataset comprises a plurality of data units, and each of the plurality of data units comprises a key;
for each of the plurality of partitions of the query dataset, perform a two-stage heavy hitter estimation process comprising:
a first stage in which, for each of the sampled data units, determine whether an estimated frequency of a key of the sampled data units meets a first stage frequency threshold; and
a second stage in which, for each of the keys of the sampled data units that has not been determined to satisfy the first stage frequency threshold, determine whether an estimated frequency of a key of the sampled data units meets a second stage frequency threshold; and
construct a partition-level heavy hitter summary for the corresponding partition of the dataset, wherein the partition-level heavy hitter summary comprises all the keys for the data units in the corresponding partition that satisfy the first stage frequency threshold in the first stage, and all the keys for the data units in the corresponding partition that satisfy the second stage frequency threshold in the second stage.

* * * * *